No. 716,516. Patented Dec. 23, 1902.
T. BOOTHROYD & J. F. JOHNSON.
INSTRUMENT FOR FITTING SPECTACLES.
(Application filed Apr. 7, 1902.)
(No Model.) 2 Sheets—Sheet 1.
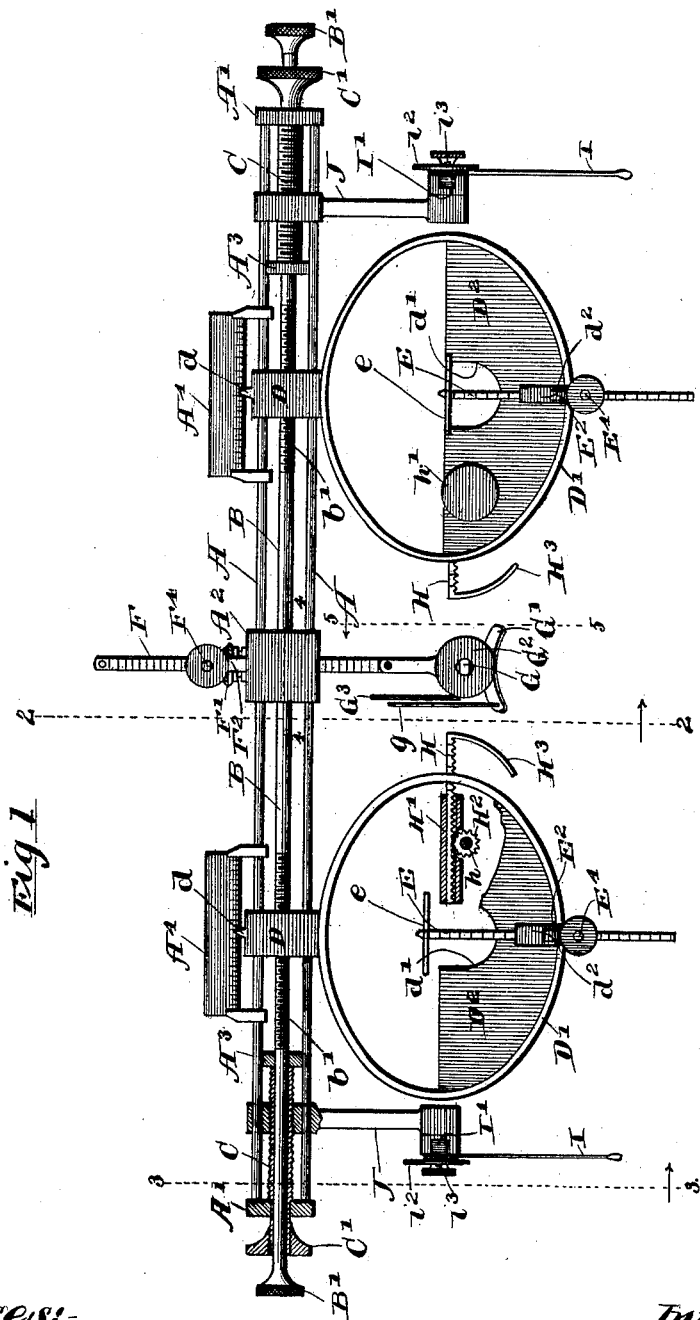
Witnesses:
Carl H. Crawford
Gertrude Bryce
Inventors:
Tufnell Boothroyd
John Frank Johnson
by Poole & Brown
their Attorneys

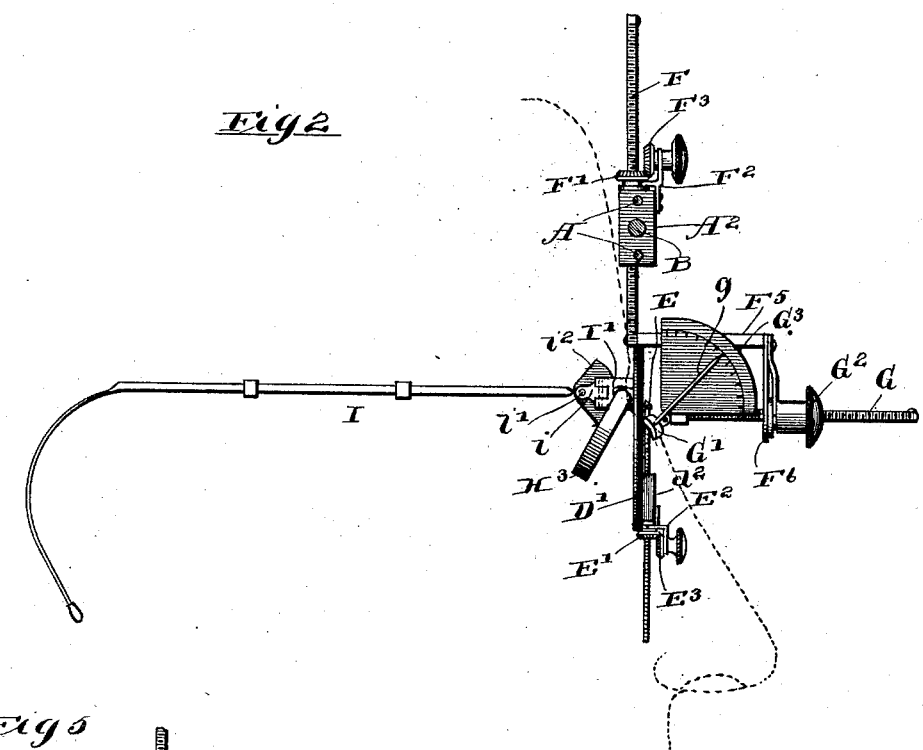

UNITED STATES PATENT OFFICE.

TUFNELL BOOTHROYD AND JOHN F. JOHNSON, OF CHICAGO, ILLINOIS.

INSTRUMENT FOR FITTING SPECTACLES.

SPECIFICATION forming part of Letters Patent No. 716,516, dated December 23, 1902.

Application filed April 7, 1902. Serial No. 101,639. (No model.)

*To all whom it may concern:*

Be it known that we, TUFNELL BOOTHROYD and JOHN F. JOHNSON, of Chicago, in the county of Cook and State of Illinois, have invented certain new and useful Improvements in Instruments for Fitting Spectacles; and we do hereby declare that the following is a full, clear, and exact description thereof, reference being had to the accompanying drawings, and to the letters of reference marked thereon, which form a part of this specification.

This invention relates to improvements in instruments for making measurements for spectacles preparatory to fitting the spectacle-frame to the patient's face; and the invention consists in the matters hereinafter set forth, and more particularly pointed out in the appended claims.

The instrument herein shown is designed for taking the following measurements: first, the pupilary distance, or the distance between the center of the spectacle-frame and the center of each pupil; second, for determining if one pupil is higher than the other and the differences, if any, in the heights; third, for determining the height of the crest of the nose relative to the horizontal pupilary line; fourth, for determining the distance between the back edge of the crest of the spectacle-frame bridge and the back plane of the lenses, so as to fit the lenses as near as possible to the eye without liability of the lashes striking the lenses; fifth, for determining the width of the nose at the base or for determining if the nose is turned toward one side or the other of the face; sixth, for determining the angle or inclination of the crest of the nose, so as to prevent the upper or lower margin of the bridge of the spectacle-frame cutting into the nose; seventh, for determining the temple distance, or width of the frame at the temple; eighth, for determining the length of the temples, and ninth for determining the angle of the lenses for reading and for determining if one ear is higher than the other, whereby from such measurements the frames may be adjusted so as to fit horizontally on the patient's face.

We have shown in the drawings an instrument capable of effecting the various measurements above mentioned and will now refer to the construction of said instrument by reference to the accompanying drawings, in which —

Figure 1 is a front elevation of said instrument with parts shown in section. Fig. 2 is a transverse vertical section taken on line 2 2 of Fig. 1. Fig. 3 is a transverse section taken on line 3 3 of Fig. 1. Fig. 4 is a fragmentary sectional detail taken on line 4 4 of Fig. 1. Fig. 5 is a fragmentary sectional detail taken on 5 5 of Fig. 1.

As shown in said drawings, the main frame of the instrument consists of two longitudinal parallel bars A A, one located vertically above the other, and end metal cross-bars A' A', connecting the ends of said longitudinal bars. $A^2$ designates a block located centrally of said frame-bars and through which the bars extend, said block being fixed to the bars in any suitable manner.

B B designate rotative shafts located in axial alinement between the bars A. Said shafts have rotative bearing at their inner ends in the block $A^2$, but are longitudinally immovable therein. As herein shown, the shafts extend one into each end of a central aperture in said block and are provided within said aperture with annular grooves $b$, which are engaged by the inner end of a screw $a$, which extends into said central aperture of said block. The outer ends of said shafts B have rotative bearing in sleeves C, which are located between the outer ends of the frame-bars A, and said shafts terminate at their extreme ends in knobs B', by which the same are given rotative movement in their bearings. The sleeves C have rotative connection with the main frame of the device, but are endwise immovable therein. For this purpose the sleeves extend at their outer ends through openings in the end bars A' of the frame and are provided with outwardly-facing shoulders which engage the inner faces of said bars and engage at their inner ends stationary blocks $A^3$, extending between and affixed to the bars A. The sleeves are provided outside of the end members A' of the frame with operating knobs C'. The purpose of said sleeves will hereinafter more fully appear. Said shafts B are provided between their ends with screw-threaded sections $b'$, on which are mounted nuts D, having screw-threaded engagement therewith, whereby when the shafts B are rotated the nuts move endwise on said frame. Said nuts have sliding engagement with the frame, being herein shown as provided with apertures through which the frame-bars extend. Attached to said nuts D and depending therefrom are oblong eyepiece-frames D', which when the instrument is in use are located in front of the patient's eyes and by means of which the pupilary height and distances are determined, as will hereinafter more fully appear. Located above said sliding nuts D and attached to the upper bars of the main frame are vertical scale-plates $A^4$. Said scale-plates are graduated, and the nuts D are provided with pointers or fingers $d$, which coöperate with said scales. When said shafts B B are rotated, it will be seen that the frames D' are moved longitudinally of the instrument, and by reason of the independent rotation of said shafts said frames D' may be moved independently one with respect to the other for measuring the pupilary distances.

The lower halves of the frames D' are filled with sheet-metal shields $D^2$, which have horizontal upper margins, and said shields are provided centrally thereof in vertical alinement with the pupils of the eye with notches or recesses $d'$, through which the reading for the pupilary distances and heights may be made. E E designate vertical bars which are located outside of said metal shields $D^2$ and centrally of the frames D'. Said bars have sliding engagement with guides $d^2$, affixed to the outer faces of said shields, as shown in Fig. 1. Said bars E are each given vertical sliding movement in its guide through the medium of a nut E', which latter has rotative bearing with but is vertically immovable in a bracket $E^2$, attached to the lower end of the guide $d^2$ of the frame D'. Said nut E' has screw-threaded engagement with the bar and has the form of a beveled pinion and meshes with a beveled pinion $E^3$, which is affixed to a rotative shaft $E^4$, which has bearing in a vertical arm of said bracket $E^2$. The outer end of said shaft $E^4$ is shaped to form a turning knob or handle. When said shaft $E^4$ is rotated, said bar E is moved upwardly or downwardly, depending upon the direction of rotation of said shaft $E^4$. The outer face of said shaft is made flat and is graduated, as shown in Fig. 1, and said graduations may be read from the upper end of the guide $d^2$. The upper ends of the bars are provided with horizontal cross-pieces $e$, as shown in Fig. 1. The purpose of said bars E is to determine the height of the pupils and whether or not one of said pupils may be located above or below the horizontal median line of the pupils. In the use of the instrument, if the pupils be located at the same height, the upper margins of the shields $D^2$ will be adjusted to the median line of the pupils and the other vertical measurements taken therefrom. In case one pupil be higher than the other the measurements will usually be taken from the horizontal line of the lower pupil, and by the use of the bars E the distance of the higher pupil from the line of the lower pupil may be determined, whereby the measurements of the spectacle-frames to be made for the patient may be constructed accordingly.

Next describing the means for determining the distance between the point on the crest of the patient's nose where the spectacle-bridge should rest and the pupilary line, these devices are made as follows: F designates a vertical screw-threaded bar which extends freely through a vertical opening in the block $A^2$. F' designates a nut which has screw-threaded engagement with said bar above said block and which is rotatively affixed to but endwise immovable on a bracket $F^2$, which is secured to the block $A^2$ in the manner shown in Fig. 2. Said nut F' has the form of a gear-pinion and meshes with a similar gear-pinion $F^3$, which is affixed to a horizontal shaft $F^4$, which has bearing in a vertical part of the bracket $F^2$. The outer end of the shaft $F^4$ is formed to provide a turning-knob. The rotation of said shaft acts to move the bar F upwardly or downwardly. Said bar F is made flat on its front face and is graduated, and said graduations may be read from the lower end of the block $A^2$. The lower end of said bar F is turned forwardly and downwardly, as shown at $F^5$ and $F^6$. The downwardly-turned part $F^6$ constitutes the support for a horizontal screw-shaft G, which extends rearwardly toward the crest of the nose of the patient and is provided at its rear end with a pivotally-connected nose-piece G', which is curved to fit the crest of the nose and adapted to bear thereagainst. Said bar G has screw-threaded engagement with a nut $G^2$, which is rotatively affixed to the vertical part $F^6$ of the bar F in the manner shown in Fig. 2. The nose-piece G', which is attached to the end of the bar G and which is adapted to bear against the crest of the nose, is provided with an index hand or pointer $g$, which coöperates with a scale on a segmental plate $G^3$, which is affixed to the inner end of said shaft G, whereby the inclination of the crest of the nose may be determined, said graduations indicating degrees of inclination. The said nose-piece freely pivots on the shaft G, whereby the registering of the inclination of the crest of the nose is rendered automatic.

Next describing the devices for determining the width of the nose at the point on which the bridge of the spectacles rests and for determining if the nose be turned toward one side or the other of the face, said parts are made as follows: H H designate horizontal bars which have sliding engagement with horizontal guides H' H', affixed to the inner faces of the shields $D^2$ of the eyepieces. The said bars are provided on their lower edges with teeth to form racks and are engaged by rotative pinions $H^2$, which are affixed to shafts $h$, which extend forwardly through the shields D² and have bearing therein. Said shafts are provided at their forward ends outside of said shields with turning knobs or thumb-pieces $h'$, by which the shafts are rotated. The inner ends of the bars are provided with downwardly and rearwardly curved end portions H³, which are adapted to bear against the sides of the nose. The front faces of said bars H are graduated, and said graduations are read from the inner margins of the frame D'.

The bows I of the instrument are hinged to the lower ends of vertical arms J J, which latter have sliding engagement with the frame-bars A, as shown in Fig. 1, and are provided between said bars with screw-threaded apertures through which extend the rotative sleeves C. Said sleeves are endwise immovable, as hereinabove explained, so that when the sleeves are rotated the arms J and the bows attached thereto are moved laterally toward and away from the center of the frame. The bows are connected with the lower ends of the arms by means of hinges I' in a manner to swing horizontally to open and close the same. In addition to said swinging movement of the bows said bows are so constructed as to enable the horizontal angle of the bows with respect to the hinge to be varied. The purpose of so arranging the bows is to enable the person taking the measurements to determine if one ear be higher than the other and the amount of variation thereof and also to secure the proper angle of the spectacle-frame for reading. As herein shown, the inner or movable part $i$ of the hinge is made separate from the principal part of the bow and is hinged thereto in a manner to permit said bow to swing vertically by means of a pivot-pin $i'$, as more clearly shown in Fig. 2. Said pivot-pin is a screw-pin and provided on its outer end with a thumb-piece, whereby when the angle of the bow is fixed the screw may be turned inwardly to lock the bow in its adjusted position. To said movable part of the hinge is affixed a segmental plate $i^2$, which is graduated, and the bow is provided with an extension $i^3$, which forms an indicating hand or pointer adapted to coöperate with graduations on the plate to indicate the inclination of the bow with respect to the horizontal. Said plate is permanently fixed to the movable part of the hinge $i$ and is located between said part of the hinge and the end of the bow, as herein shown, and the pivot-pin $i'$ extends through the bow and plate and into the movable part of the hinge. Said bows are made longitudinally extensible in any suitable manner in order to measure the temple lengths, as indicated in Fig. 2; but as this part of the construction does not constitute a feature of our invention the same need not be more minutely described.

The manner of using the instrument described for taking various measurements referred to is as follows: The instrument is placed upon the patient's face, with the center block A² of the frame located centrally above the patient's nose and with the nose-piece G' resting on the crest of the nose. Usually the frame is first raised or lowered, as required, to bring the upper margins of the shields of the eyepieces in the plane of the pupilary line, such raising or lowering being effected by rotating the nut F' of the bar F through the operating-shaft F⁴. By reason of the fact that the nose-piece G', which is connected with the bar F, rests on the crest of the nose and is therefore vertically immovable rotation of said nut F' acts to raise or lower the frame. The amount of raising and lowering of the frame is indicated by the scale on the bar F, and by a proper arrangement of the scale with respect to its reading-point said scale will indicate the distance between the nose-crest on which the bridge of a spectacle-frame should rest and the pupilary height or the level of the upper margins of the plates D². As soon as the nose-piece G' strikes the crest of the nose the angle of the crest is at once automatically registered, such automatic operation being due to the free pivotal connection of the nose-piece with the shaft G. If it be found that one or the other of the pupils is below or above the median pupilary line, one of the bars E is raised or lowered, as the case may be, to determine the amount of such variation. As before stated, if one of the pupils is lower than the other the measurements are desirably taken from the lowest pupil. Thereafter the pupilary distance between the pupils and the center of the crest of the nose is ascertained, and this is effected by moving the eyepieces inwardly or outwardly, as required, by turning the shafts B, said eyepieces being adjusted to bring the upper ends of the bars E in vertical alinement with the pupils. As the eyepieces are independently movable, the adjustment may be accurately made for each eye without reference to the other. Moreover, by reason of the provision of the shield D², provided with the recess or depression in its upper margin, through which the lower part of the eye is visible, taken in connection with the bar E, variations of the pupils from vertical median lines, as occurs in strabismus, may be readily detected and the amount of convergence or divergence measured. The temple width may next be determined by rotation of the sleeve C, which moves the arms J and bows I outwardly or inwardly, as required. Thereafter the thumb-screws $i^3$ are released and the angle of the bows and the angle of the lenses determined, such angles being determined from the scale on the plate $i^2$. In taking this measurement the thumb-screws or pivot-pins $i^3$ are first released and the eyepieces of the instrument leveled to correspond to the pupilary median line and the proper angle to be given to the lenses for reading, and said thumb-screws are then locked. If one ear be higher than the other, one scale will show a greater inclination than the other, which difference will be taken into account in fitting the spectacle-frame. The next measurement to be made is the width of the nose at the crest, which is taken by moving the bars H inwardly until they are brought into contact with the nose. If the nose is turned to one side of the face, the divergence will appear on the record taken from the scales of said bars, as each bar H is independently adjustable and takes its own measurement regardless of the action of the other. The last measurement to be made is usually that to determine the distances between the base of the crest of the nose and the plane of the rear surfaces of the lenses. This distance is ascertained by moving the eyepieces backwardly or forwardly by means of the thumb-nut $G^2$ and the shaft G, the eyepieces being moved to such positions that the eyelashes just clear the rear surfaces of the eyepieces.

It will be understood that the foregoing procedure may be greatly varied, as nearly all the devices for taking the measurements are independent of the others, so that it matters little which measurements be taken first. This feature of the invention is of considerable importance, for the reason that a measurement once taken with an independently-operable device is not afterward disturbed by the operation of another measuring device. It is furthermore obvious that many of the structural details may be varied without departing from the spirit of our invention, and we do not wish to be limited to such details, except as hereinafter made the subject of specific claims.

We claim as our invention—

1. In a spectacle-measuring instrument, the combination with an eyepiece and a shield filling the lower half of the eyepiece and provided on its upper margin with a centrally-located recess, the upper half of the eyepiece being unobstructed to the vision.

2. A spectacle-measuring instrument comprising a horizontal frame, two eyepieces, means for independently moving the eyepieces toward and away from each other, shields filling the lower halves of the eyepieces and having horizontal upper margins located in the same plane, said upper margins of the shields being centrally notched or recessed.

3. A spectacle-measuring instrument comprising a main frame, two eyepieces, and means independently movable on the eyepieces for determining variations of the pupils from the median horizontal pupillary line.

4. A spectacle-measuring instrument comprising a horizontal frame, two eyepieces, means for independently moving the eyepieces toward and away from each other and means independently movable on the eyepieces for determining the variations of the pupils from the median horizontal pupillary line.

5. A spectacle-measuring instrument comprising a horizontal frame, two eyepieces, means for independently moving the eyepieces toward and away from each other, and independent vertically-movable bars having sliding engagement with the eyepieces for measuring the heights of the pupils.

6. A spectacle-measuring instrument comprising a horizontal frame, two eyepieces, means for independently moving the eyepieces toward and away from each other, vertically-movable bars having sliding engagement with said eyepieces, a nut having screw-threaded engagement with each of said bars and having teeth or cogs thereon and a gear-pinion meshing with said teeth or cogs of the nut for raising and lowering said bar.

7. A spectacle-measuring instrument comprising a horizontal frame, two eyepieces, means for independently moving the eyepieces toward and away from each other, shields filling the lower halves of said eyepieces and provided in their upper margins with recesses, and vertically-movable bars on said eyepieces and located centrally of said notches or recesses.

8. A spectacle-measuring instrument comprising a horizontal frame, two eyepieces, means for independently moving the eyepieces toward and from each other, shields filling the lower halves of said eyepieces and provided in their upper margins with recesses, and vertically-movable bars on said eyepieces located centrally of the notches and provided at their upper ends with cross-pieces.

9. In a spectacle-measuring instrument, the combination with a frame, of means on the frame for determining the divergence of a nose which is turned toward one side of the face.

10. In a spectacle-measuring instrument, the combination with a frame, of means for measuring the width of the nose, said means being constructed to determine the divergence of a nose which is turned toward one side of the face.

11. A spectacle-measuring instrument comprising a horizontal frame, two eyepieces, means for independently moving the eyepieces toward and away from each other, and independently-operable means on each eyepiece for measuring the width of the nose.

12. A spectacle-measuring instrument comprising a horizontal frame, two eyepieces, means for independently moving the eyepieces toward and away from each other, and bars having sliding engagement with the eyepieces, said bars being independently movable with respect to each other and to each eyepiece, and extending inwardly therefrom for measuring the width of the nose.

13. A spectacle-measuring instrument comprising a horizontal frame, two eyepieces, means for independently moving the eyepieces toward and away from each other, and means for measuring the width of the nose comprising two parts supported on the device one on each side of the center thereof, and each independently movable with respect to the support and to each other.

14. A spectacle-measuring instrument comprising a horizontal frame, two eyepieces, means for independently moving the eyepieces toward and away from each other, horizontal bars having sliding engagement with said eyepieces and extending inwardly therefrom for measuring the width of the nose, racks on said bars and rotative gear-pinions meshing with said racks for giving endwise movement to said bars.

15. In a spectacle-measuring instrument the combination with a frame, of a plate which has vertical and pivotal movement thereon, and adapted to bear against the crest of the nose and a scale for registering the inclination of said plate.

16. A spectacle-measuring instrument provided with a vertically-movable part, a plate pivoted to said part and adapted to bear upon the crest of the nose and a scale for registering the inclination of said plate.

17. A spectacle-measuring instrument comprising a horizontal frame, a vertically-movable bar therein, a pivoted nose-piece connected with the lower end of the bar and adapted to bear against the crest of the nose, and a scale for registering the inclination of said nose-piece.

18. A spectacle-measuring instrument comprising a horizontal frame, a vertically-movable bar therein, a pivoted nose-piece connected with the lower end of the bar and adapted to bear against the crest of the nose, a scale for registering the inclination of said nose-piece, and means for raising and lowering said bar.

19. A spectacle-measuring instrument comprising a horizontal frame, a vertically-movable bar having guiding engagement with said frame, said bar being screw-threaded, a nose-piece carried by the lower end of said bar, and means for raising and lowering the bar comprising a nut having screw-threaded engagement with the bar, said nut having rotative engagement with the frame but being endwise immovable with respect thereto, gear teeth or cogs on said nut and a rotative gear-pinion intermeshing with the teeth of said nut.

20. A spectacle-measuring instrument comprising a horizontal frame, two eyepieces connected therewith, a vertically-movable bar having guiding engagement with the frame, means for raising and lowering the bar in said frame, a horizontal shaft carried by the lower end of the bar, means for moving said shaft transversely of the frame, a nose-piece pivotally connected with the inner end of said shaft adapted to bear upon the crest of the nose, and means for registering the angle of said nose-piece.

21. A spectacle-measuring instrument comprising a horizontal frame, two eyepieces connected therewith, a vertically-movable bar having guiding engagement with the frame, means for raising and lowering the bar in said frame, a horizontal shaft carried by the lower end of the frame, means for moving said shaft transversely of the frame, a nose-piece pivotally connected by the inner end of said shaft adapted to bear on the crest of the nose, a pointer on said nose-piece, and a scale-plate carried by said shaft and coöperating with said pointer.

22. A spectacle-measuring instrument comprising a horizontal frame, two eyepieces connected therewith, a vertically-movable bar having guiding engagement with said frame, a horizontal screw-threaded shaft carried by the lower end of said bar, a nut which has rotative connection with the bar and has screw-threaded engagement with the shaft, a nose-piece pivoted to the inner end of the screw-threaded shaft and means for registering the inclination of the nose-piece.

23. A spectacle-measuring instrument comprising a horizontal frame, eyepieces connected with said frame and independently movable thereon toward and from each other, arms depending from said frame outside of and independent from said eyepieces, temple-bows hinged to said arms, and means for moving said arms longitudinally of the frame independently of each other.

24. A spectacle-measuring instrument comprising a horizontal frame, eyepieces connected with said frame and independently movable toward and away from each other, arms depending from said frame outside of and independent from said eyepieces, temple-bows hinged to said arms, and means for moving said arms longitudinally of said frame independently of each other and the eyepieces.

25. A spectacle-measuring instrument comprising a horizontal frame, two nuts having sliding engagement with said frame, eyepieces depending from said nuts, axially alined, rotative, endwise-immovable shafts in said frame which have screw-threaded engagement with said nuts, two arms depending from said frame one located outside of each of said eyepieces and having sliding engagement with said frame, temple-bows hinged to the lower ends of said arms, and tubular screw-threaded shafts surrounding the outer ends of the eyepiece-operating shafts, said tubular shafts being endwise immovable in said frame and having screw-threaded engagement with the upper ends of said arms.

26. A spectacle-measuring instrument comprising a horizontal frame, two eyepieces connected therewith and independently movable longitudinally of the frame, two arms depending from said frame outside of said eyepieces and having sliding connection with said frame independently with respect to each other and the eyepieces, temple-bows hinged to the lower ends of said arms to swing vertically, and means for registering the vertical inclination of the temple-bows.

27. A spectacle-measuring instrument comprising a horizontal frame, two eyepieces connected therewith, means for independently moving said eyepieces toward and away from each other, temple-bows hinged to said frame and means independent of the eyepieces for moving the hinged ends of the temple-bows toward and away from each other.

28. In a spectacle-measuring instrument the combination with means for determining the pupillary height, of means for determining at the same time and without removing the instrument from the patient's face, the distance between the pupillary height and the point of the nose of the patient on which the bridge of a spectacle-frame should rest.

29. In a spectacle-measuring instrument the combination with means for determining the pupillary height, constructed to indicate the height of one pupil above the other, of means for determining at the same time and without removing the instrument from the patient's face the distance between the median pupillary height and the point on the nose of the patient on which the bridge of a spectacle-frame should rest.

30. In a spectacle-measuring instrument the combination with means for determining the pupillary height, of means for determining the distance between the pupillary height and the point on the nose of the patient on which the bridge of a spectacle-frame should rest, said last-mentioned means being provided with means for determining the inclination of the crest of the nose.

31. In a spectacle-measuring instrument the combination with a frame, and means for determining the distances between the pupils and the center of the frame, of means for independently determining the width of the nose, said last-mentioned means being constructed to determine the divergence of a nose which is turned toward one side of the face.

32. A spectacle-measuring instrument comprising a horizontal frame, means for determining the pupillary height, a vertically-movable bar on said frame and a nose-piece pivotally connected with the lower end of the bar and adapted to rest on the crest of the patient's nose.

In testimony that we claim the foregoing as our invention we affix our signatures, in presence of two witnesses, this 4th day of April, A. D. 1902.

TUFNELL BOOTHROYD.
JOHN F. JOHNSON.

Witnesses:
WILLIAM L. HALL,
GERTRUDE BRYCE.